United States Patent
Adachi

(10) Patent No.: US 8,819,921 B2
(45) Date of Patent: Sep. 2, 2014

(54) MANUFACTURING METHOD OF A PERMANENT MAGNET DISPODED IN A ROTATING ELECTRICAL MACHINE

(75) Inventor: Shuuji Adachi, Tokyo (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/698,574

(22) PCT Filed: Apr. 22, 2011

(86) PCT No.: PCT/JP2011/059968
§ 371 (c)(1),
(2), (4) Date: Nov. 16, 2012

(87) PCT Pub. No.: WO2011/145433
PCT Pub. Date: Nov. 24, 2011

(65) Prior Publication Data
US 2013/0057374 A1    Mar. 7, 2013

(30) Foreign Application Priority Data
May 19, 2010    (JP) .................................. 2010-115125

(51) Int. Cl.
H01F 7/06 (2006.01)
H02K 15/03 (2006.01)
H01F 41/02 (2006.01)
H01F 7/02 (2006.01)
H02K 1/27 (2006.01)

(52) U.S. Cl.
CPC ............ *H02K 15/03* (2013.01); *H01F 41/0253* (2013.01); *H01F 7/0221* (2013.01); *H02K 1/276* (2013.01)
USPC ................ 29/607; 29/417; 29/592.1; 29/596; 29/598; 335/302; 335/303; 335/304; 335/305; 335/306; 310/156.07; 310/156.38; 310/263

(58) Field of Classification Search
CPC ...... H01F 7/025; H01F 41/0253; H02K 15/03
USPC ............. 29/417, 592.1, 593, 602.1, 605–607; 335/302–306; 156/60, 580
See application file for complete search history.

(56) References Cited

U.S. PATENT DOCUMENTS

| 5,201,117 | A | * | 4/1993 | Wright ........................ 29/890.05 |
| 5,438,264 | A | * | 8/1995 | Takeshima et al. ........... 324/319 |
| 5,523,732 | A | * | 6/1996 | Leupold ........................ 335/306 |
| 5,634,263 | A | * | 6/1997 | Leupold ........................... 29/607 |
| 6,369,571 | B1 | * | 4/2002 | Damadian et al. ............. 324/318 |

(Continued)

FOREIGN PATENT DOCUMENTS

| JP | 57-59400 A | 4/1982 |
| JP | 2005116844 A | 4/2005 |

(Continued)

*Primary Examiner* — Paul D Kim
(74) *Attorney, Agent, or Firm* — Foley & Lardner LLP

(57) ABSTRACT

There are provided a process of forming a recess groove having a depth shallower than and a width larger than the notch groove for fracturing at a portion of fracturing and splitting in the permanent magnet; a process of forming the notch groove for fracturing the permanent magnet in a groove bottom of the recess groove formed in the recess-groove forming process; and a process of fracturing and splitting the permanent magnet along the notch groove so as to obtain magnet pieces.

4 Claims, 6 Drawing Sheets

(56) References Cited

U.S. PATENT DOCUMENTS

| | | | |
|---|---|---|---|
| 6,621,207 B2 * | 9/2003 | Uda et al. | 313/485 |
| 6,768,407 B2 * | 7/2004 | Kohda et al. | 335/306 |
| 6,777,063 B2 * | 8/2004 | Born | 428/167 |
| 6,790,308 B2 * | 9/2004 | Murphy et al. | 156/265 |
| 6,848,170 B1 * | 2/2005 | Damadian et al. | 29/607 |
| 6,940,379 B2 * | 9/2005 | Creighton | 335/306 |
| 7,127,802 B1 * | 10/2006 | Damadian et al. | 29/607 |
| 7,586,226 B2 * | 9/2009 | Kihara | 310/74 |
| 7,814,632 B2 * | 10/2010 | Burkhardt | 29/417 |
| 8,056,198 B2 * | 11/2011 | Nakazawa | 29/25.35 |
| 8,497,613 B2 * | 7/2013 | Nakamura et al. | 310/156.38 |
| 8,510,933 B2 * | 8/2013 | Murakami et al. | 29/607 |
| 2003/0053208 A1 * | 3/2003 | Hata et al. | 359/484 |
| 2008/0036324 A1 * | 2/2008 | Kihara | 310/153 |
| 2010/0244608 A1 | 9/2010 | Nakamura et al. | |
| 2012/0036696 A1 | 2/2012 | Murakami et al. | |

FOREIGN PATENT DOCUMENTS

| | | |
|---|---|---|
| JP | 2006-121807 A | 5/2006 |
| JP | 2006-238633 A | 9/2006 |
| JP | 2009-142081 A | 6/2009 |
| WO | WO 2010/038748 A1 | 4/2010 |

* cited by examiner

FRACTURED SURFACE FLATNESS

US 8,819,921 B2

MANUFACTURING METHOD OF A PERMANENT MAGNET DISPODED IN A ROTATING ELECTRICAL MACHINE

TECHNICAL FIELD

The present invention relates to a permanent magnet disposed in a rotating electrical machine such as an electric motor and an electric generator, and a manufacturing method of the same.

BACKGROUND ART

Conventionally, by splitting a permanent magnet embedded in a rotor core of a rotating electrical machine by cleaving so as to reduce its surface area, an eddy current generated by fluctuation in an acting magnetic field has been reduced and heat generation of the permanent magnet caused by the eddy current has been suppressed, thereby preventing irreversible thermal demagnetization.

In JP2009-142081A, a permanent magnet in which a notch which becomes a target of cleaving is provided in advance is inserted into a container having an inner hollow dimension and an inner hollow shape of a rotor slot and filled with a resin, then the permanent magnet is cleft into magnet pieces in the container and the resin is made to infiltrate between the magnet pieces at the same time as the cleaving.

SUMMARY OF INVENTION

When the notch which becomes the target of the cleaving is provided in the permanent magnet as in JP2009-142081A, the deeper the depth of the notch, or the sharper a distal end of the notch, the better the flatness of a cleft surface. Thus, groove machining using a laser beam is preferable. However, in the groove machining using the laser beam, burrs are raised from the magnet surface and adhere to an edge portion of the notch by the volume of the notch. Since the burrs are raised from the surface of the magnet piece, they interfere with alignment of the magnet pieces on the same surface and cause misalignment between the fractured surfaces. Thus, if the resin is made to infiltrate between the magnet pieces at the same time with cleaving, there is a concern that the magnet pieces are bound to each other by the resin in a state where they are misaligned due to burrs causing heat resistance performances of the permanent magnet to deteriorate, and lower output performances of a motor.

The present invention has an object, therefore, to provide a permanent magnet disposed in a rotor core of a rotating electrical machine and a manufacturing method of the same suitable for aligning and binding magnet pieces without displacement.

In order to achieve the above-described object, the present invention is characterized by including a process of forming a recess groove having a depth shallower than that of a notch groove for fracturing and a width larger than a width of the notch groove at a portion of fracturing and splitting of the permanent magnet, a process of forming a notch groove for fracturing the permanent magnet in a groove bottom of the recess groove formed in the recess-groove forming process, and a process of fracturing and splitting the permanent magnet along the notch groove so as to obtain magnet pieces.

The details and other characteristics and merits of this invention will be explained in the description below and illustrated in the attached drawings.

DESCRIPTION OF EMBODIMENTS

A permanent magnet disposed in a rotor core of a rotating electrical machine and a manufacturing method of the same of the present invention will be described below on the basis of an embodiment illustrated in FIGS. 1 to 10.

Figure 1B:
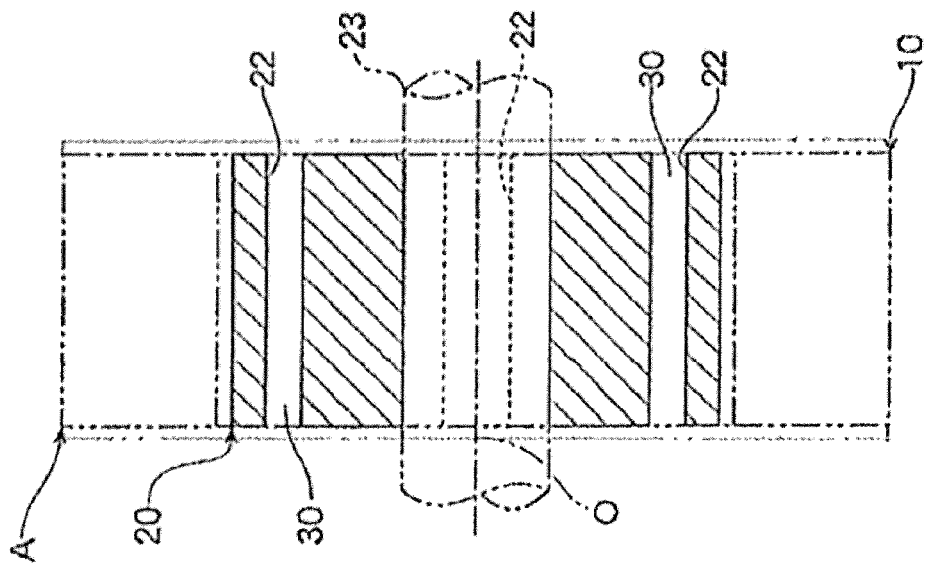
FIG. 1B is a sectional view along I-I line in FIG. 1A.
Figure 1A:
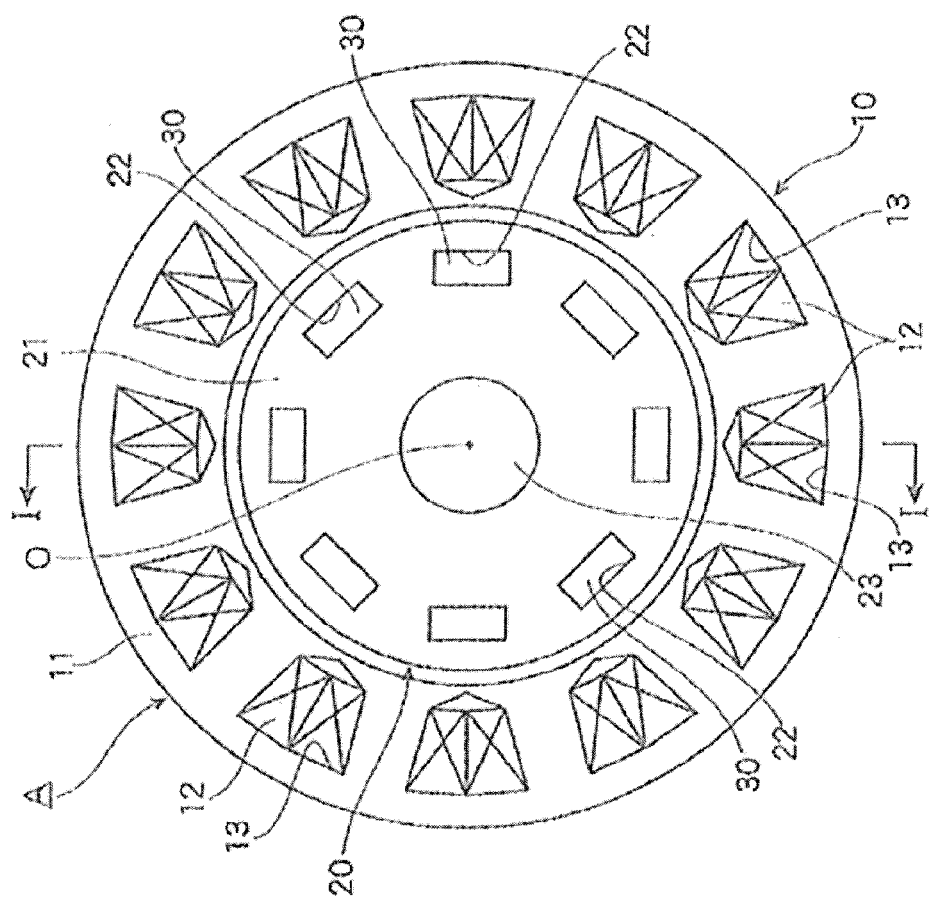
FIG. 1A is a front view illustrating an outline configuration of a rotating electrical machine to which a permanent magnet according to an embodiment of the present invention is applied.

In FIG. 1, a permanent-magnet embedded rotating electrical machine A (hereinafter referred to simply as a "rotating electrical machine A") is formed of an annular stator 10 constituting a part of a casing, not shown, and a columnar rotor 20 arranged coaxially with this stator 10.

The stator 10 includes a stator core 11 and a plurality of coils 12. In the stator core 11, slots 13 are formed at equiangular intervals on the same circumference having a shaft center O at the center. The plurality of coils 12 are accommodated in the slots 13 formed in the stator core 11.

The rotor 20 includes a rotor core 21, a rotating shaft 23 integrally rotating with the rotor core 21, and a plurality of permanent magnets 30. In the rotor core 21, slots 22 are formed at equiangular intervals on the same circumference having the shaft center O at the center. The plurality of permanent magnets 30 are accommodated in the slots 22 formed in the rotor core 21.

Figure 2:
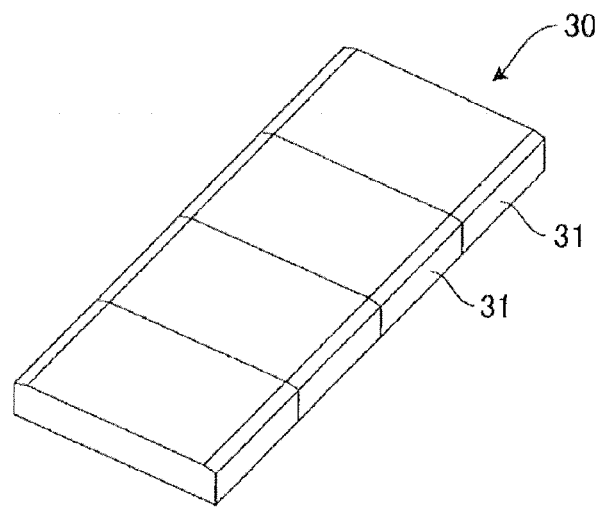
FIG. 2 is a perspective view of the permanent magnet.

The permanent magnet 30 accommodated in the slot 22 is, as illustrated in FIG. 2, formed as a collection of magnet pieces 31 aligned in a row by bonding the plurality of magnet pieces 31 formed by fracturing and splitting the permanent magnet 30 with each other on fractured surfaces by a resin. The resin used is provided with heat resistance performances of approximately 200° C., for example, and electrically insulates the adjacent magnet pieces 31 from each other. As a result, since an eddy current generated by fluctuation in an acting magnetic field remains in each of the magnet pieces 31 and is reduced, heat generation of the permanent magnet 30 caused by the eddy current is suppressed, and irreversible thermal demagnetization can be prevented.

In order to fracture and split the permanent magnet 30 into a plurality of the magnet pieces 31, it is effective to form a notch groove in advance at a portion where the permanent magnet 30 is to be fractured. The deeper the depth from the surface or the sharper the distal end of the notch groove, the better the flatness of a fractured surface of the notch groove.

A method of forming the notch groove includes a method of providing the notch groove by a projection for forming the groove provided in a molding die of the permanent magnet 30 in a molding process of the permanent magnet 30, a method by using mechanical machining such as a dicer, a method by using laser beam irradiation and the like.

With the method of providing the notch groove by a protrusion for forming a groove provided in the molding die of the permanent magnet 30 in the molding process of the permanent magnet 30, the depth and the sharpness of the distal end of the notch groove provided in the permanent magnet 30 have limitations. Thus, the flatness of the fractured surface when the permanent magnet is fractured into the magnet pieces 31 becomes low.

With the method by using mechanical machining such as a dicer or the like, if the distal end shape of a grinding stone is made sharp, the notch groove can be made deep and sharp. However, if a distal end of the grinding stone is thin and deep, grinding stone rigidity is lowered, causing abrasion to occur early, and increasing a running cost. Thus, in this method, too, the depth and the sharpness of the distal end of the notch groove have limitations. Thus, the flatness of the fractured surface when the permanent magnet is fractured into the magnet pieces 31 becomes low.

With the method using laser beam irradiation, the distal end of the notch groove can be made sharp, and if the depth of the notch groove is to be suppressed, equipment to be used is inexpensive, and the running cost can be kept low. In order to increase the depth of the notch groove, it is only necessary to increase a laser beam output, but power consumption increases in proportion to the laser beam output and the equipment in use becomes expensive. Moreover, with the method using the laser beam irradiation, a material in a region molten as the notch groove is pushed out to and accumulated on the both sides of the notch groove by a volume of the groove to be formed in the magnet surface. Eventually, the accumulated material causes burrs on the magnet surface on the both sides of the notch groove.

Thus, in this embodiment, a manufacturing method of the permanent magnet 30 is provided in which the notch groove is formed by the method using the laser beam irradiation, and the burrs generated on the both sides of the notch groove are prevented from protruding from the magnet surface.

FIGS. 3 to 6 illustrate a manufacturing process of the permanent magnet 30 in this embodiment. First, the permanent magnet 30 (FIG. 3) having a recess groove 32 is formed, then a notch groove 33 (FIG. 4) is formed by applying a laser beam to the recess groove 32. Subsequently, the permanent magnet is fractured by an external force along the notch groove 33 (FIG. 5), fractured surfaces are bonded (FIG. 6) to each other by a resin, and the permanent magnet 30 to be embedded in the rotor core 21 of the rotating electrical machine is formed. Each process will be described below in detail.

Figure 3A:
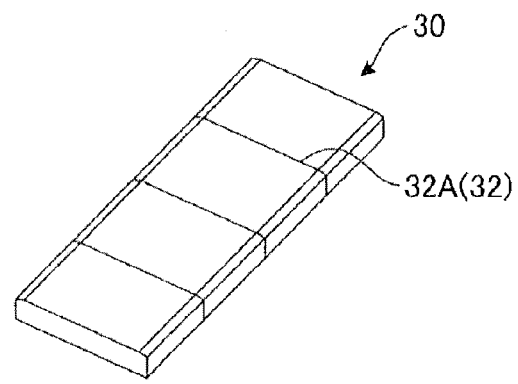
FIG. 3A is a perspective view illustrating a manufacturing process of the permanent magnet.
Figure 3B:
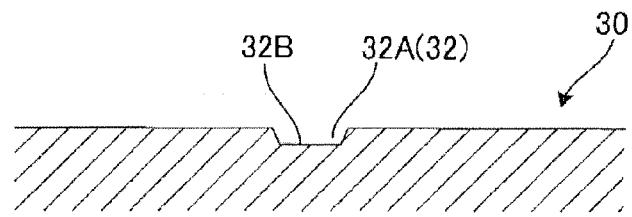
FIG. 3B is a sectional view of an essential part of FIG. 3A.

The permanent magnet 30 before the notch groove 33 is machined has, as illustrated in FIG. 3, a trapezoidal groove 32A, for example, formed as the recess groove 32 in advance at a portion where the notch groove 33 is to be formed. This recess groove 32 is formed in a plurality of portions juxtaposed at equal intervals in a longitudinal direction, for example, to be fractured and split into a plurality of the magnet pieces 31 on one of surfaces of the permanent magnet 30 in a width direction of the permanent magnet 30. The recess groove 32 can be formed at the same time as sintering and molding of the permanent magnet 30 by using a molding die by providing a projection for forming a trapezoidal groove on a cavity surface of the molding die. In this case, since the projection for forming a trapezoidal groove provided on the cavity surface of the molding die does not have a sharp part, a trapezoidal groove 32A can be formed stably and inexpensively in the sintered and molded permanent magnet 30.

Moreover, as another molding method of the trapezoidal groove 32A, the trapezoidal groove may be ground and molded by a dicer in sintered and molded permanent magnet 30. In the case of molding by using a dicer, since a sectional shape of the grinding stone is trapezoidal and does not have a sharp shape, abrasion of the grinding stone can be suppressed, and a running cost can be kept low.

Figure 7:
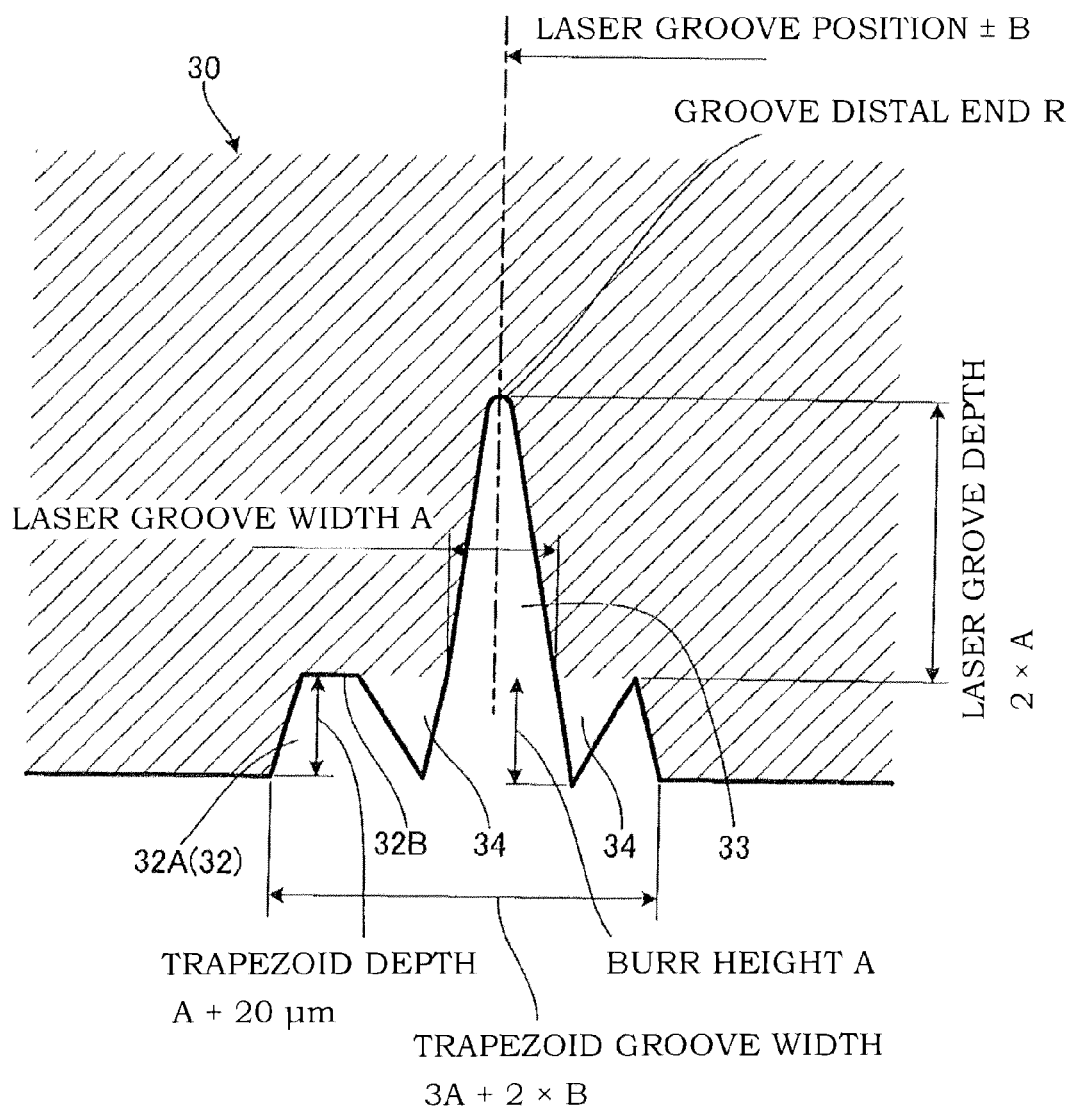
FIG. 7 is a detailed sectional view of the essential part of the permanent magnet before fracturing.

The depth of the trapezoidal groove 32A is determined by a depth dimension required for forming the notch groove 33 by using laser beam machining in a groove bottom 32B and an amount of pushed-out molten material, that is, a height dimension of a burr 34. For example, as illustrated in FIG. 7, assuming that a width of the notch groove 33 formed by using the laser beam machining is "A $\mu$m" and the depth of the notch groove 33 is "2×A $\mu$m", the height of the burr 34 pushed out by the laser beam and accumulated becomes approximately "A $\mu$m". Thus, by setting the depth of the trapezoidal groove 32A to be formed to a dimension larger than the height "A $\mu$m" of the accumulated burr 34, the distal end of the burr 34 can be prevented from protruding from the surface of the permanent magnet 30. Here, considering variation in the height of the burr 34, if a standard value of the height of the burr 34 is "A $\mu$m" and the variation is "±20 $\mu$m", for example, the depth of the trapezoidal groove 32A to be formed can be set to "A+20 $\mu$m".

Moreover, the width of the trapezoidal groove 32A is determined on the basis of a dimension obtained by adding a width dimension of the burr 34 formed on the both sides of the notch groove 33 by using the laser beam machining to the width dimension of the notch groove 33 formed by using the laser beam machining. For example, assuming that the width dimension of the notch groove 33 is "A $\mu$m" and the width dimension of the burr 34 is "2A $\mu$m", a dimension exceeding the dimension "A $\mu$m+2A $\mu$m=3A $\mu$m" obtained by adding up all these width dimensions is a width dimension of the trapezoidal groove 32A to be formed. Here, if a positional variation amount of the notch groove 33 by using the laser beam machining is "±B $\mu$m", a positional variation amount "2B $\mu$m" is further added, and the width dimension of the trapezoidal groove 32A to be formed can be set to "(3A+2B) $\mu$m". The positional variation amount of the notch grove 33 by using the laser beam machining is calculated from positioning accuracy of the permanent magnet 30 and beam positioning accuracy of a laser beam device. By setting as above, the notch groove 33 and the burr 34 can be reliably accommodated in the trapezoidal groove 32A.

In the above, the trapezoidal groove 32A is described as the recess groove 32, but the recess groove 32 may be such that a side wall forms an arc shape and smoothly connects the groove bottom 32B and the surface of the permanent magnet 30.

Figure 4:
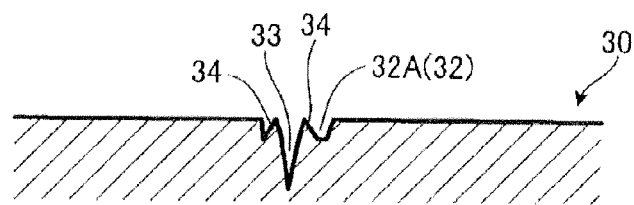
FIG. 4 is a sectional view of the essential part illustrating a manufacturing process subsequent to FIG. 3 of the permanent magnet.

Subsequently, a laser beam is applied to the groove bottom 32B of the trapezoidal groove 32A so as to form the notch groove 33 as illustrated in FIG. 4. The material molten in the notch groove 33 is blown out by the laser beam from the notch groove 33 and accumulated as the burr 34 on the groove bottom 32B of the trapezoidal groove 32A located on the both sides of the notch groove 33. This burr 34 has, as described above, its distal end prevented from protruding from the surface of the permanent magnet 30 and is reliably accommodated in the trapezoidal groove 32A.

Figure 5:
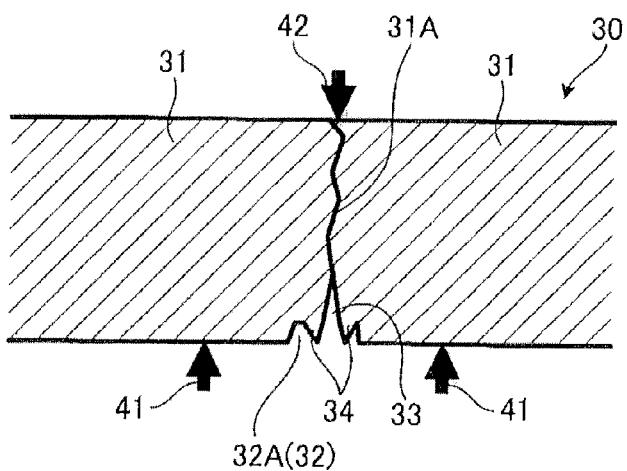
FIG. 5 is a sectional view of the essential part illustrating a manufacturing process subsequent to FIG. 4 of the permanent magnet.
Figure 8:
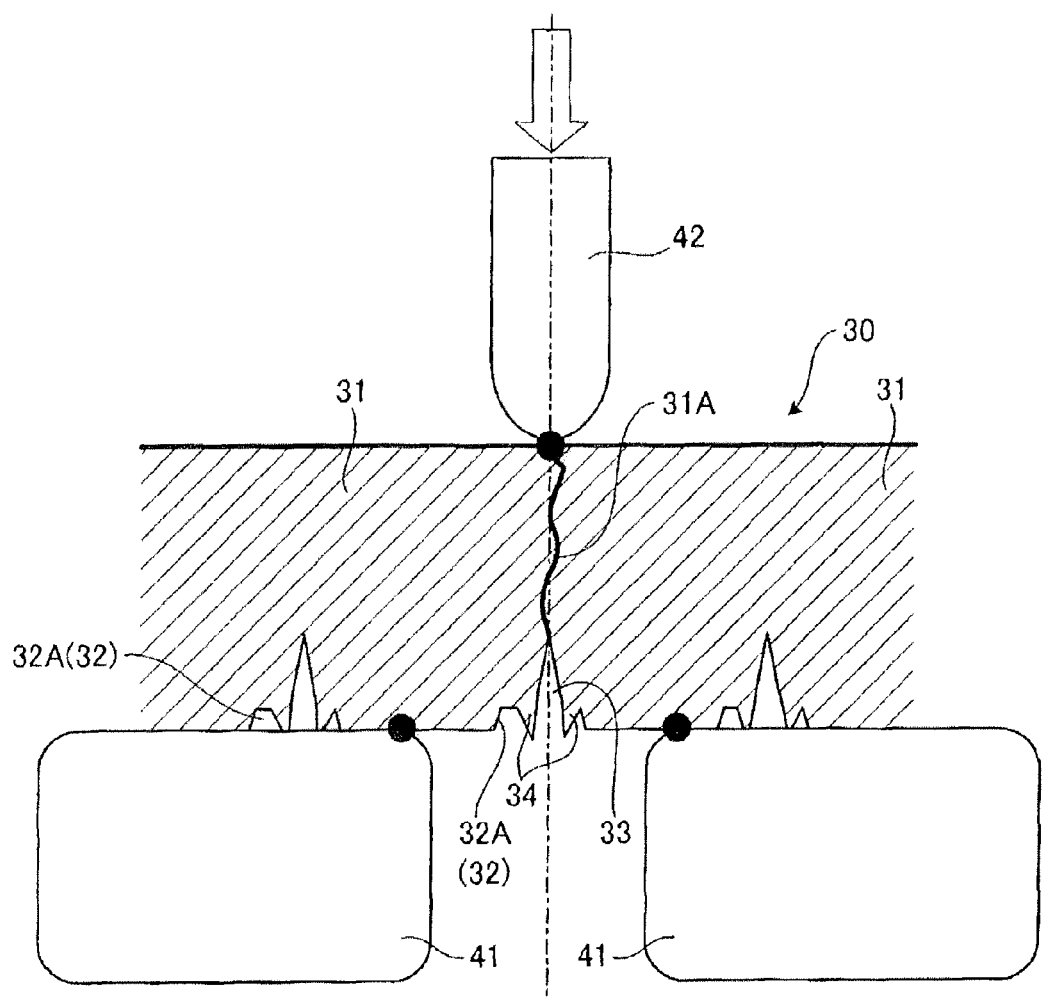
FIG. 8 is a sectional view illustrating a state when the permanent magnet is fractured.

Subsequently, as illustrated in FIGS. 5 and 8, the permanent magnet 30 is positioned so that a surface in which the recess groove 32 and the notch groove 33 are formed in the permanent magnet 30 comes to a lower surface and the recess groove 32 and the notch groove 33 are located at the center of a pair of supporting jigs 41 and placed on the supporting jigs 41. Then, a blade 42 aligned with the center of the notch groove 33 is brought into contact with a back surface of the permanent magnet 30 where the recess groove 32 and the notch groove 33 are located, and moreover, the blade 42 is pressed in an arrow direction and the permanent magnet 30 is bent at three points, so that the permanent magnet 30 is fractured and split into the magnet pieces 31.

In this case, the pair of supporting jigs 41 are arranged symmetrically to the center of the blade 42, the blade 42 is arranged at a center position of the pair of supporting jigs 41, and the blade 42 is elevated up and down along the center position of the pair of the supporting jigs 41. Then, the permanent magnet 30 is placed on the supporting jigs 41 with the center of the notch groove 33 aligned to the center of the blade 42. That is, the center of the notch groove 33 is positioned with respect to the center of the blade 42 and does not necessarily have to be matched with the center of the trapezoidal groove 32A. It is not the case if the center of the notch groove 33 accidentally matches the center of the trapezoidal groove 32A.

Figure 10:
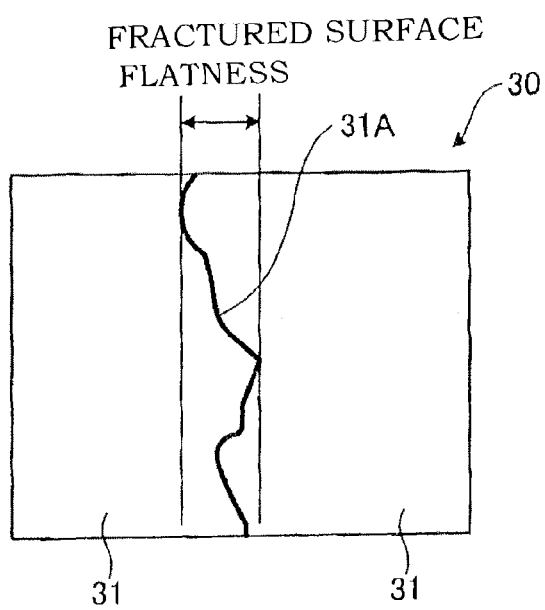
FIG. 10 is an explanatory diagram for explaining flatness of a fractured surface.

Flatness which is an index of surface roughness of the fractured surface 31A of the magnet piece 31 can be, as illustrated in FIG. 10, defined by an interval between a plane including the most dented spot in the fractured surface 31A and orthogonal to the longitudinal direction of the permanent magnet 30 and a plane in parallel with this plane and including the most protruding spot. From this interval, it can be determined that the smaller the interval, the higher the flatness, while the larger this interval, the lower the flatness.

The flatness of the fractured surface 31A depends on the depth from a support surface by the supporting jigs 41 to a position at the distal end of the notch groove 33 which is a start point of crack occurrence in the bending at three points by the blade 42 and the pair of supporting jigs 41 and sharpness of a distal end R of the notch groove 33, that is, smallness of the R. That is, the deeper the depth from the support surface by the supporting jigs 41 to the position at the distal end of the notch groove 33, the better the flatness of the fractured surface 31A, while the shallower the depth, the worse the flatness of the fractured surface 31A. Moreover, the sharper the distal end R of the notch groove 33, that is, the smaller the R, the better the flatness of the fractured surface 31A, while the duller the distal end R, that is, the larger the R, the worse the flatness of the fractured surface 31A.

Moreover, the slower an increase speed of a pushing-in load of the blade 42, the better the flatness of the fractured surface 31A, while the faster the increase speed, the worse the flatness.

In this embodiment, since the notch groove 33 is formed in the groove bottom 32B of the trapezoidal groove 32A, the depth from the support surface by the supporting jigs 41 to the position of the distal end of the notch groove 33 can be made deeper, and the flatness of the fractured surface 31A can be improved. Moreover, the distal end R of the notch groove 33 can be formed sharp since the notch groove 33 is formed by using the laser beam irradiation, and the flatness of the fractured surface 31A can be improved in this point, too.

Moreover, since the notch groove 33 is formed in the groove bottom 32B of the trapezoidal groove 32A, a machining amount by the laser beam irradiation required to have the depth of the notch groove 33 with which the flatness of the fractured surface 31A is kept in a predetermined range is reduced by a portion of the depth of the trapezoidal groove 32A than the case where the notch groove 33 is formed without providing the trapezoidal groove 32A. Thus, a laser beam output for forming the notch groove 33 can be decreased, working time for the notch groove 33 can be reduced, and facilities such as laser beam equipment and the like can be simplified. At the same time, an amount of the burrs 34 formed on the both sides of the notch groove 33 by the laser beam irradiation becomes relatively small, and the height of the burr 34 can be also lowered.

Subsequently, a plurality of fractured and split magnet pieces 31 are aligned at intervals. In this case, since the burr 34 generated during formation of the notch groove 33 by using laser beam irradiation is accommodated in the recess groove 32 and the distal end thereof does not protrude from the surface of the magnet, whichever surface of the magnet piece 31 is oriented downward in alignment, each magnet piece 31 does not surface but can be aligned.

Figure 6:
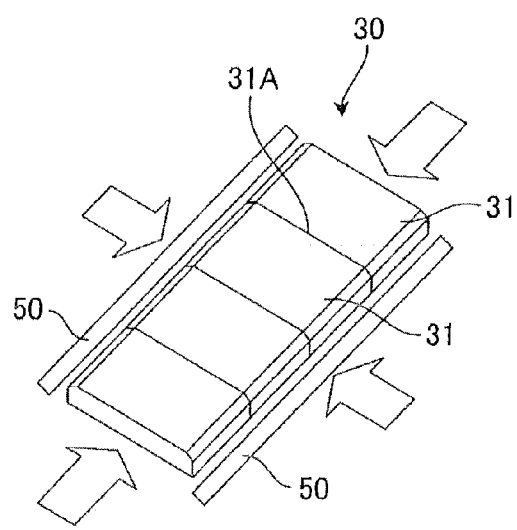
FIG. 6 is a perspective view illustrating a manufacturing process subsequent to FIG. 5 of the permanent magnet.

Subsequently, a resin which becomes an adhesive is supplied between the magnet pieces 31. The supplied resin is filled between the opposing fractured surfaces 31A of the magnet pieces 31. Then, as illustrated in FIG. 6, by pressurizing from the longitudinal direction of the permanent magnet 30 in a state where an aligning jig 50 is pressed from the width direction of the permanent magnet 30, the resin infiltrates over the whole region of the opposing fractured surfaces 31A and an excess resin is pushed out, so that the fractured surfaces 31A of the magnet pieces 31 are bonded to each other by the adhesive. Moreover, as described above, since the flatness of the fractured surfaces 31A can be made higher, the fractured surfaces 31A can be fitted with each other with accuracy by matching their respective projections and recesses accurately.

Figure 9:
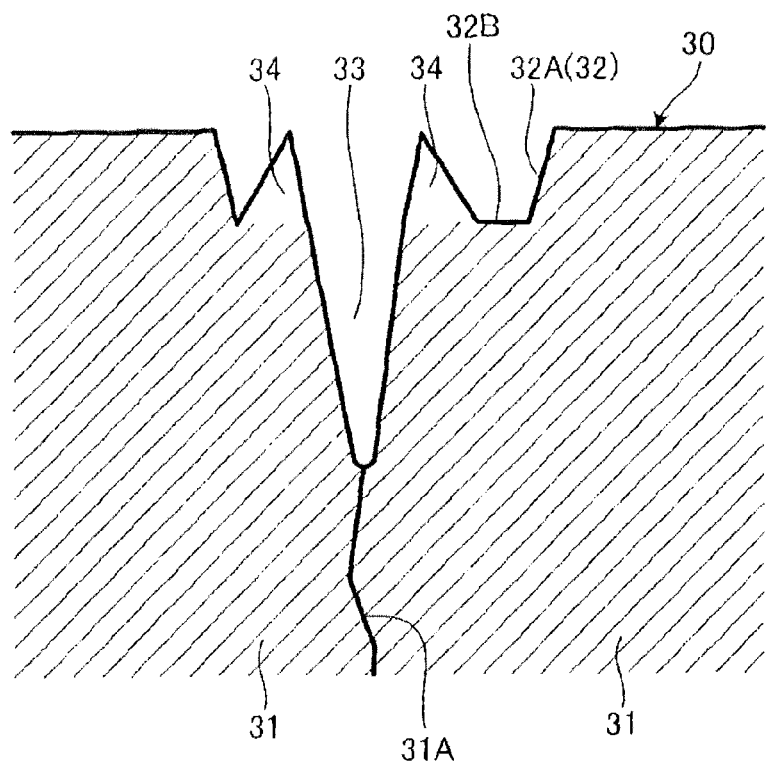
FIG. 9 is a sectional view of the essential part of the permanent magnet illustrating a state where magnet pieces are bonded.

Accordingly, the integrated permanent magnet 30 illustrated in FIG. 2 can be obtained. This permanent magnet 30 has, as illustrated in FIG. 9, the fractured surfaces 31A bonded to each other by the resin, and the adjacent magnet pieces 31 electrically insulated. Therefore, in use by being assembled into the slot 22 of the rotor core 21, an eddy current generated by fluctuation in the acting magnetic field is retained in the individual magnet pieces 31 and reduced and heat generation caused by the eddy current is suppressed, thereby preventing irreversible thermal demagnetization. Moreover, since the burr 34 generated during formation of the notch groove 33 by using the laser beam irradiation is accommodated in the recess groove 32, and the distal end thereof does not protrude from the surface of the permanent magnet 30, inconvenience of the burr 34 getting caught by the edge of the slot 22 of the rotor core 21 and the permanent magnet 30 not being able to assemble to the rotor core 21 is prevented. Therefore, when the permanent magnet 30 is inserted into the slot 22, such inconvenience as the burr 34 separating from the permanent magnet 30 and drops into the rotating electrical machine case, causing biting into a rotating part and burning can be prevented.

The embodiment of the present invention has been described but the above-described embodiment illustrates only a part of application examples of the present invention and is not intended to limit a technical scope of the present invention to a specific configuration of the above-described embodiment.

This application claims for priority on the basis of Japanese Patent Application No. 2010-115125 filed with Japan Patent Office on May 19, 2010 and all the contents of this application is incorporated in this description by reference.

The invention claimed is:

1. A manufacturing method of a permanent magnet disposed in a rotating electrical machine, in which a plurality of magnet pieces formed by fracturing and splitting the permanent magnet along a notch groove are aligned and bonded to each other, comprising:
   a step of forming a recess groove having a depth shallower than and a width larger than the notch groove at a portion of fracturing and splitting in the permanent magnet;
   a step of forming the notch groove for fracturing the permanent magnet by using laser beam machining in a groove bottom of the recess groove formed in the recess-groove forming step; and
   a step of fracturing and splitting the permanent magnet along the notch groove so as to obtain magnet pieces.

2. The manufacturing method of the permanent magnet disposed in the rotating electrical machine according to claim 1, wherein
   the recess groove is provided with a groove width 3 times or more with respect to the groove width of the notch groove formed in the groove bottom of the recess groove and is provided with a depth 0.5 times or more with respect to a groove depth of the notch groove.

3. The manufacturing method of the permanent magnet disposed in the rotating electrical machine according to claim 1, wherein
   a sectional shape of the recess groove is trapezoidal whose groove width becomes smaller toward the groove bottom.

4. The manufacturing method of the permanent magnet disposed in the rotating electrical machine according to claim 1, wherein
   a groove bottom of the recess groove is flat.

* * * * *